(12) United States Patent
Sun

(10) Patent No.: US 6,227,518 B1
(45) Date of Patent: May 8, 2001

(54) PIVOT BASE FOR A COMPUTER MONITOR

(75) Inventor: Ming-Shen M. Sun, Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 09/391,448

(22) Filed: Sep. 8, 1999

(51) Int. Cl.[7] .................................................. A47G 29/00
(52) U.S. Cl. ............................................. 248/923; 248/371
(58) Field of Search ................................... 248/923, 371, 248/372.1, 919, 393

(56) References Cited

U.S. PATENT DOCUMENTS

| | | | |
|---|---|---|---|
| 4,494,720 | * 1/1985 | Gregory | 248/371 |
| 4,533,105 | * 8/1985 | Cornwell | 248/371 |
| 4,562,988 | * 1/1986 | Bumgardner | 248/371 |
| 4,621,782 | * 11/1986 | Carlson | 248/923 |
| 4,706,920 | * 11/1987 | Ojima | 248/923 |
| 4,858,864 | * 8/1989 | Thompson | 248/923 |
| 5,520,361 | * 5/1996 | Lee | 248/923 |
| 5,704,581 | * 1/1998 | Chen | 248/371 |

FOREIGN PATENT DOCUMENTS

128511 * 12/1984 (EP) ..................................... 249/923

* cited by examiner

Primary Examiner—Alvin Chin-Shue
(74) Attorney, Agent, or Firm—Pillsbury Winthrop LLP

(57) ABSTRACT

A pivot base for a computer monitor includes a base member, a monitor supporting member and a releasable retaining unit. The base member has a top side and a pair of mounting plates that project upwardly at the top side and that are spaced apart in a transverse direction. The monitor supporting member is adapted for mounting the computer monitor thereon. The monitor supporting member is mounted movably between the mounting plates, and is movable relative to the base member in a first direction for locating the computer monitor in a generally upright position and in a second direction for locating the computer monitor in an inclined position. The releasable retaining unit is provided on the base member and the monitor supporting member to arrest relative movement therebetween.

2 Claims, 5 Drawing Sheets

PIVOT BASE FOR A COMPUTER MONITOR

BACKGROUND OF THE INVENTION

1. Field of the Invention

The invention relates to a base for a computer monitor, more particularly to a pivot base for a liquid crystal display monitor.

2. Description of the Related Art

A conventional notebook computer includes a main board housing and a monitor housing that are hinged to each other. Since friction force is generally used to retain the monitor housing at a desired tilting angle relative to the main board housing, the hinge construction of the conventional notebook computer is not suitable for application to a standalone liquid crystal display monitor in view of the relatively large size of the latter. There is thus a need to develop a pivot base that is capable of supporting relatively large liquid crystal display monitors.

SUMMARY OF THE INVENTION

Therefore, the object of the present invention is to provide a pivot base that can serve as a stable and angle-adjustable support for liquid crystal display monitors of different sizes.

According to the present invention, a pivot base for a computer monitor includes a base member, a monitor supporting member and a releasable retaining unit. The base member has a top side and a pair of mounting plates that project upwardly at the top side and that are spaced apart in a transverse direction. The monitor supporting member is adapted for mounting the computer monitor thereon, and is mounted movably between the mounting plates. The monitor supporting member is movable relative to the base member in a first direction for locating the computer monitor in a generally upright position relative to the base member, and in a second direction for locating the computer monitor in an inclined position relative to the base member. The releasable retaining unit is provided on the base member and the monitor supporting member to arrest relative movement therebetween.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
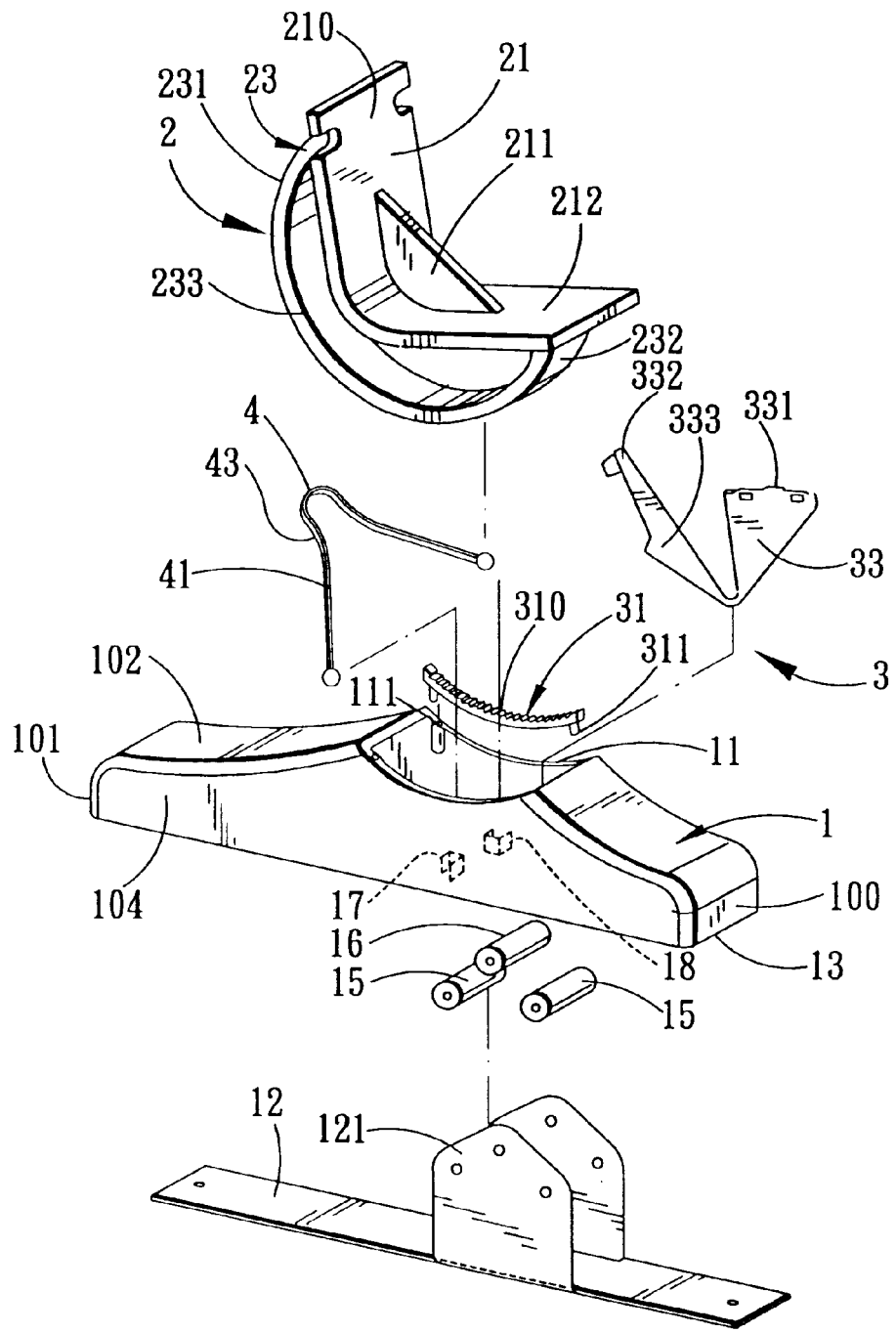
FIG. 1 is an exploded view of the preferred embodiment of a pivot base according to the present invention.
Figure 2:
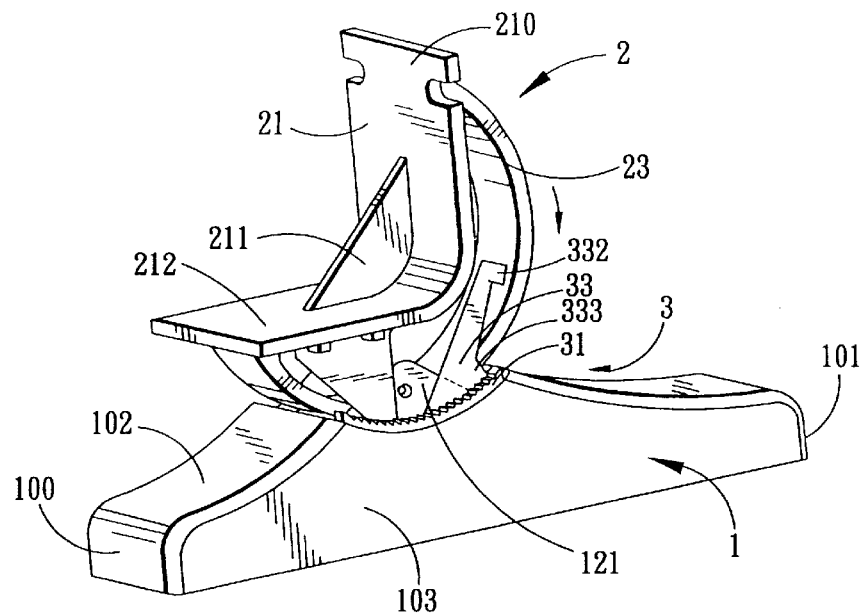
FIG. 2 is an assembled perspective view of the preferred embodiment.
Figure 3:
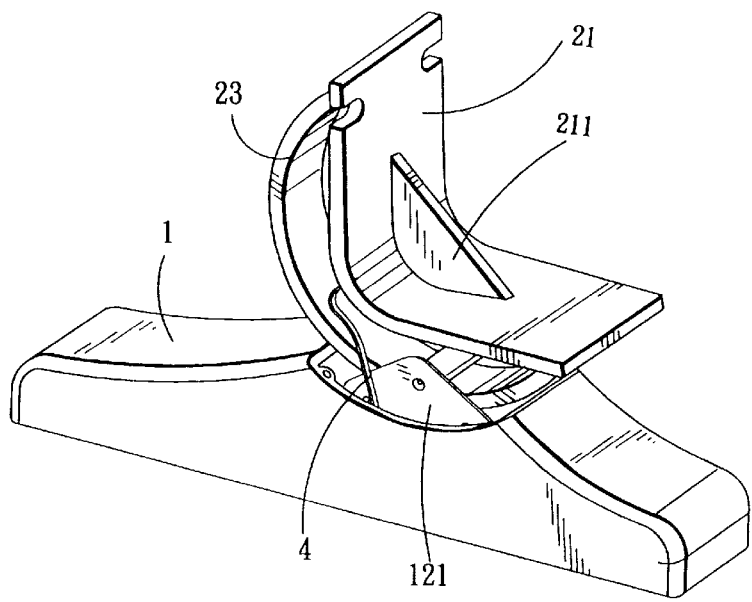
FIG. 3 is another assembled perspective view of the preferred embodiment when viewed from another angle.

Referring to FIGS. 1, 2 and 3, the preferred embodiment of a pivot base according to the present invention is shown to comprise a hollow base member 1, a monitor supporting member 2, a releasable retaining unit 3 and a biasing member 4.

The base member 1 has a front end 100, a rear end 101 opposite to the front end 100 in a longitudinal direction, a bottom side 13 adapted to be placed on a surface, such as a table (not shown), first and second lateral side walls 103, 104 that extend in the longitudinal direction and that are opposite to each other in a transverse direction relative to the longitudinal direction, and a top side 102 that extends in the longitudinal direction between the front and rear ends 100, 101 and that is formed with a generally rectangular opening 11 at an intermediate section thereof. The first lateral side wall 103 is formed with a pair of insert sockets 111 (only one is shown in FIG. 1) on an inner wall surface thereof adjacent to a longitudinal edge of the opening 11. The insert sockets 111 are spaced apart in the longitudinal direction. An elongate base plate 12 is mounted securely on the bottom side 13 of the base member 1, and has opposite longitudinal edges formed with a parallel pair of uprightly extending mounting plates 121. The mounting plates 121 have distal top portions that project upwardly at the top side 102 of the base member 1 via the opening 11. A parallel pair of lower cylindrical rollers 15 extend between the mounting plates 121 in the transverse direction, and have opposite ends mounted rotatably on the distal top portions of the mounting plates 121, respectively. The lower cylindrical rollers 15 are spaced apart in the longitudinal direction. An upper cylindrical roller 16 also extends between the mounting plates 121 in the transverse direction, and has opposite ends mounted rotatably on the distal top portions of the mounting plates 121, respectively. The upper cylindrical roller 16 is disposed above and between the lower cylindrical rollers 15 such that the upper cylindrical roller 16 is spaced apart from each of the lower cylindrical rollers 15 in both the vertical and longitudinal directions.

Figure 4:
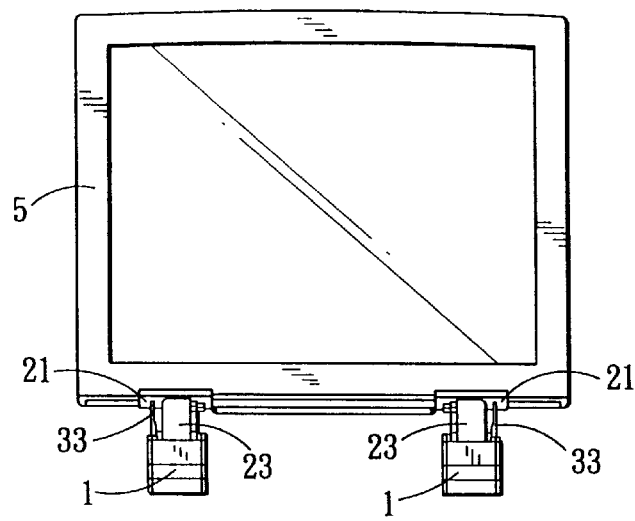
FIG. 4 is a schematic front view illustrating how two pivot bases of the preferred embodiment support a computer monitor.
Figure 5:
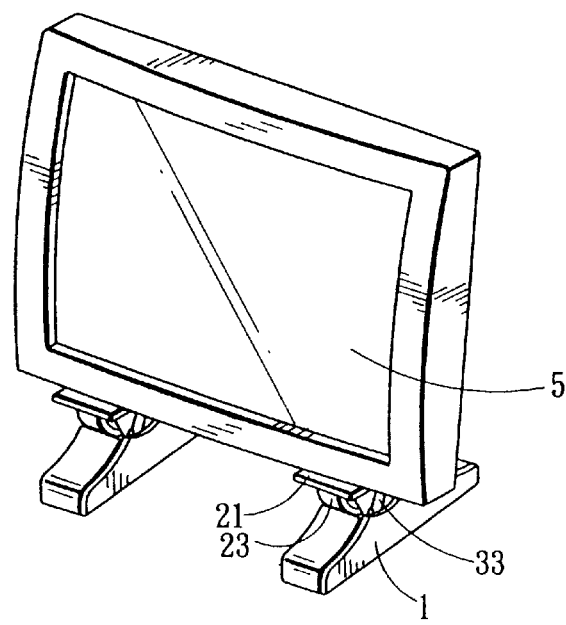
FIG. 5 is a perspective view illustrating how the two pivot bases of FIG. 4 support the computer monitor.
Figure 6:
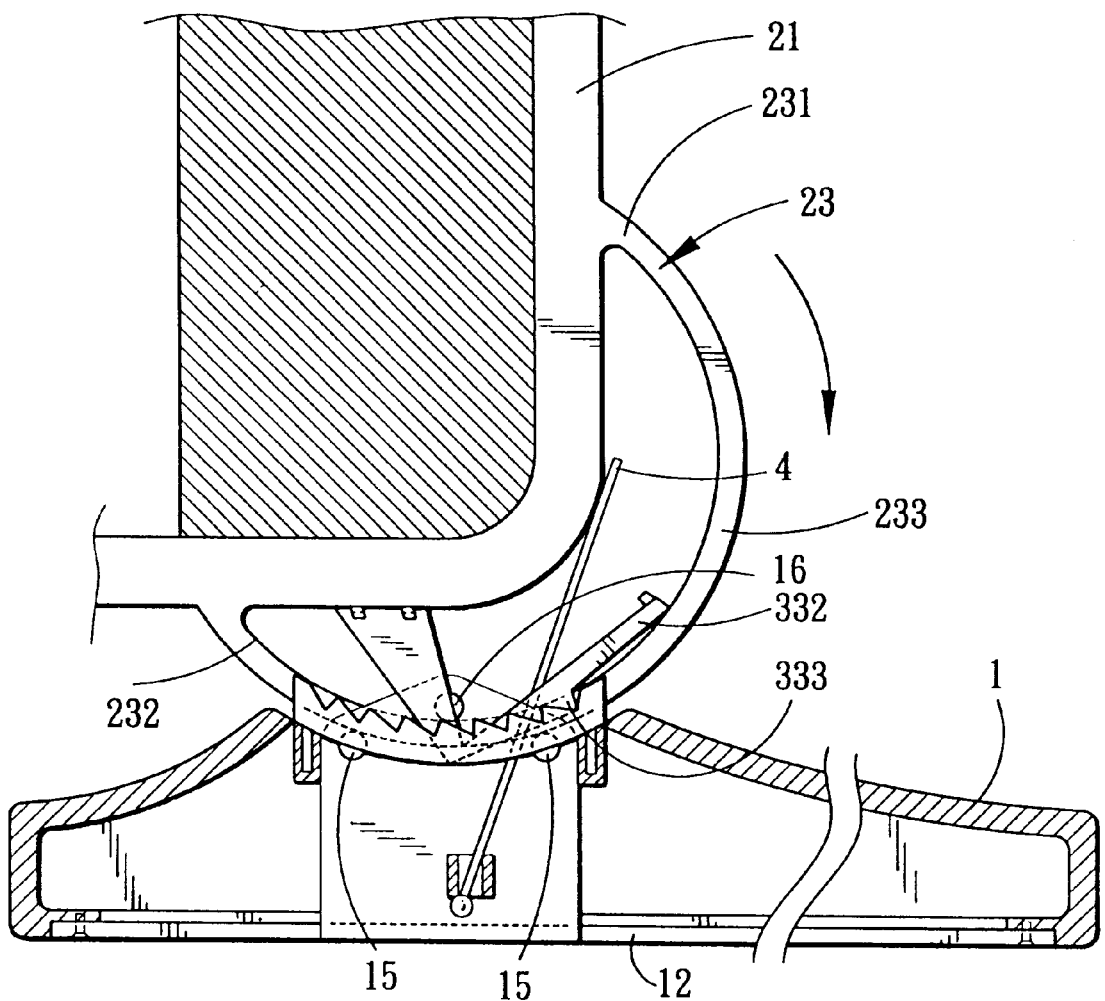
FIG. 6 is a sectional view illustrating the pivot base of the preferred embodiment when used to support the computer monitor in a generally upright position.
Figure 7:
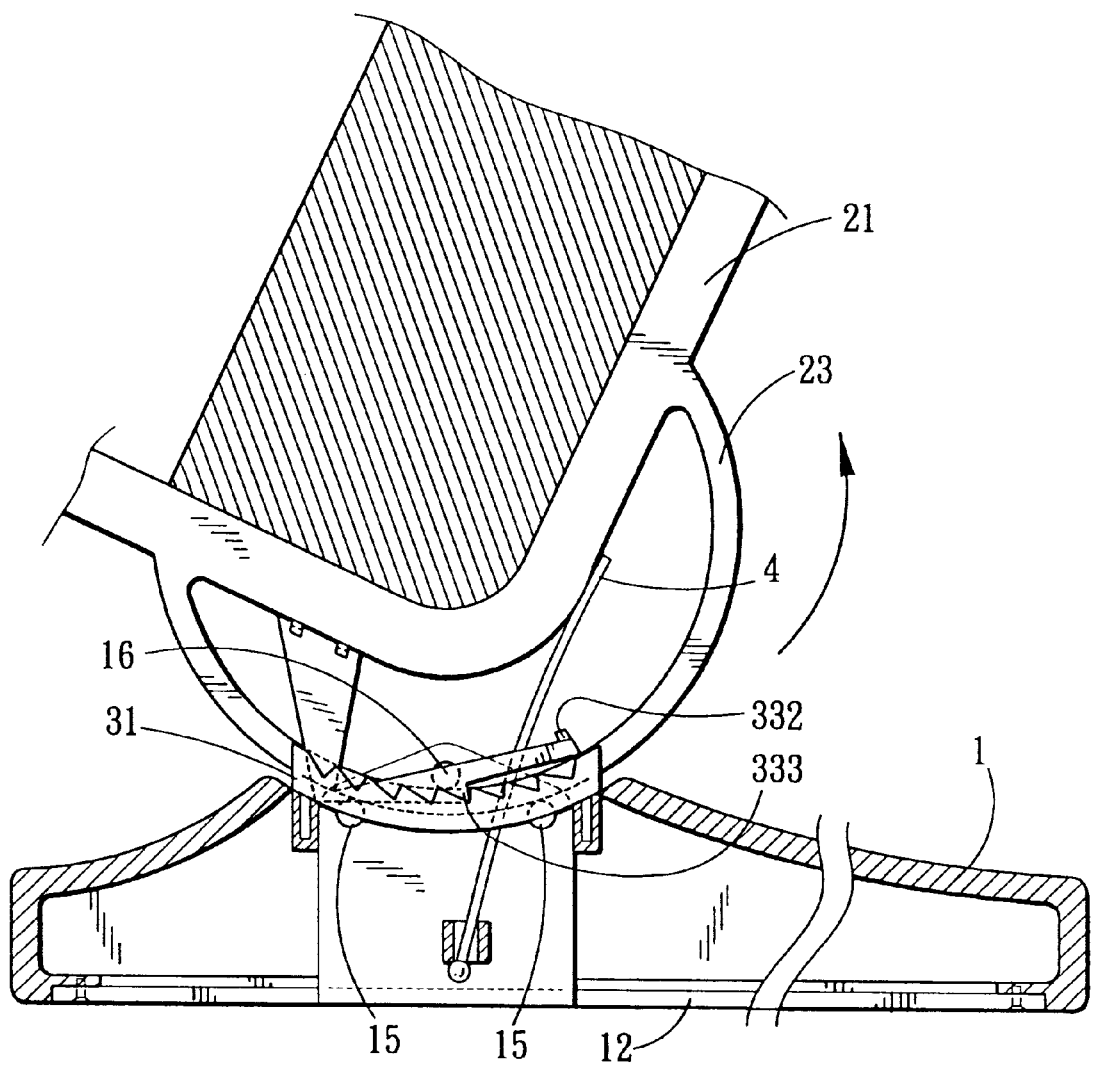
FIG. 7 is a sectional view illustrating the pivot base of the preferred embodiment when used to support the computer monitor in an inclined position.

The monitor supporting member 2 includes a generally L-shaped monitor mounting portion 21, and a generally C-shaped slide plate portion 23. The monitor mounting portion 21 has an upright plate section 210 with upper and lower ends, and a transverse plate section 212 that extends from the lower end of the upright plate section 210. The slide plate portion 23 has a first end portion 231 disposed behind the upright plate section 210 and connected to the upper end of the upright plate section 210, a second end portion 232 disposed below the transverse plate section 212 and connected to a distal end of the transverse plate section 212, and an intermediate portion 233 between the first and second end portions 231, 232. The intermediate portion 233 is clamped by the lower and upper cylindrical rollers 15, 16 such that a bottom surface of the intermediate portion 233 is in contact with the lower cylindrical rollers 15, while a top surface of the intermediate portion 233 is in contact with the upper cylindrical roller 16. By virtue of the engagement between the slide plate portion 23 and the lower and upper cylindrical rollers 15, 16, the monitor mounting portion 21 can be tilted forwardly and rearwardly relative to the base member 1. The monitor mounting portion 21 further has a monitor engaging plate 211 disposed at a juncture of a front side of the upright plate section 210 and a top side of the transverse plate section 212 for engaging the housing of a computer monitor 5 (see FIG. 4), such as a liquid crystal display monitor.

The retaining unit 3 includes an elongate rack member 31 formed with rack teeth 310, and a restraining member 33. The rack member 31 is formed with a pair of mounting legs 311 that extend downwardly into the base member 1 via the opening 11 for engaging the insert sockets 111 on the first lateral side wall 103, thereby mounting the rack member 31 on the top side 102 of the base member 1 at one side of the monitor supporting member 2. The rack member 31 extends in the longitudinal direction. The restraining member 33, which is in a form of a generally V-shaped plate, extends into the base member 1 through the opening 11 and is disposed between the insert sockets 111. The restraining member 33 has an anchoring portion 331 with an upper section secured to the monitor mounting portion 21 of the monitor supporting member 2, and an engaging portion 332 that extends from a lower section of the anchoring portion 331 and that forms an angle with the anchoring portion 331. The engaging portion 332 has a distal operating section disposed outwardly of the base member 1, and an intermediate section formed with a pawl 333 for engaging selectively and removably the rack teeth 310 of the rack member 31.

The biasing member 4 is in the form of a generally U-shaped spring strip having first and second leg portions 41, 43. Each of the first and second leg portions 41, 43 extends into the base member 1 through the opening 11, and has a lower leg end anchored to the base member 1 at a leg retainer 17, 18 that is provided on the inner wall surface of a respective one of the first and second lateral side walls 103, 104 of the base member 1, and an upper leg end that abuts against a rear side of the upright plate section 210 of the monitor mounting portion 21 of the monitor supporting member 2. The biasing member 4 resists forward tilting movement of the monitor mounting portion 21 relative to the base member 1.

As shown in FIGS. 4 to 7, in use, a pair of the pivot bases of the present invention support lower left and lower right corners of the housing of the computer monitor 5. Particularly, the monitor engaging plate 211 on the monitor mounting portion 21 of the monitor supporting member 2 of each of the pivot bases engages a respective one of the lower left and lower right corners of the housing of the computer monitor. When it is desired to adjust the tilting angle of the computer monitor, the distal operating section of the engaging portion 332 of the restraining member 33 is operated to disengage the pawl 333 from the rack teeth 310 of the rack member 31. The computer monitor 5 can then be tilted rearwardly from a generally upright position (see FIG. 6) to an inclined position (see FIG. 7), or forwardly from the inclined position back to the generally upright position. Upon locating the computer monitor 5 at the desired tilting angle relative to the base member 1, the distal operating section of the engaging portion 332 of the restraining member 33 is once again operated to engage the pawl 333 with the rack teeth 310 of the rack member 31, thereby arresting relative movement between the base member 1 and the monitor supporting member 2 to retain the computer monitor 5 at the desired tilting angle.

Unlike the hinge construction found in conventional notebook computers, the pivot base of the present invention does not use pivot shafts that extend into the housing of the computer monitor for adjusting the tilting angle of the latter. Moreover, the retaining member 3 is provided for retaining the computer monitor at the desired tilting angle, thereby resulting in a stronger retention force which can resist slipping that is usually encountered when the known hinge construction of notebook computers is used to support relatively large liquid crystal display monitors. The spring force of the biasing member 4 can be selected according to the range of tilting movement and the size of the computer monitor to assist in the adjustment of the tilting angle of the latter. In addition, the shape and configuration of the base member 1 can be varied to suit the computer monitor for enhancing consumer appeal.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A pivot base for a computer monitor, comprising:

a base member having a top side and a pair of mounting plates that project upwardly at said top side and that are spaced apart in a transverse direction;

said base member having a pair of lower cylindrical rollers that extend between and that are mounted rotatably on said mounting plates, and an upper cylindrical roller that extends between and that is mounted rotatably on said mounting plates, said upper cylindrical roller being disposed above and between said lower cylindrical rollers;

a monitor supporting member adapted for mounting the computer monitor thereon, said monitor supporting member being mounted movably between said mounting plates, and being movable relative to said base member in a first direction for locating the computer monitor in a generally upright position relative to said base member and in a second direction for locating the computer monitor in an inclined position relative to said base member;

said monitor supporting member including a generally L-shaped monitor mounting portion and a generally C-shaped slide plate portion, said monitor mounting portion having an upright plate section and a transverse plate section that extends from said upright plate section, said slide plate portion having a first end portion disposed behind and connected to said upright plate section, a second end portion disposed below and connected to said transverse plate section, and an intermediate portion between said first and second end portions and having upper and lower surfaces, said intermediate portion between said first and second end portions and having upper and lower surfaces, said intermediate portion being clamped by said lower and upper cylindrical rollers such that said bottom surface is in contact with said lower cylindrical rollers and said top surface is in contact with said upper cylindrical roller; and a releasable retaining unit provided on said base member and said monitor supporting member to arrest relative movement therebetween.

2. The pivot base as claimed in claim 1, wherein said monitor mounting portion is provided with a monitor engaging plate adapted for mounting the computer monitor on said monitor mounting portion.

* * * * *